May 30, 1967 A. M. PORKESS ETAL 3,321,824
PISTONS
Filed Dec. 4, 1964 2 Sheets-Sheet 1
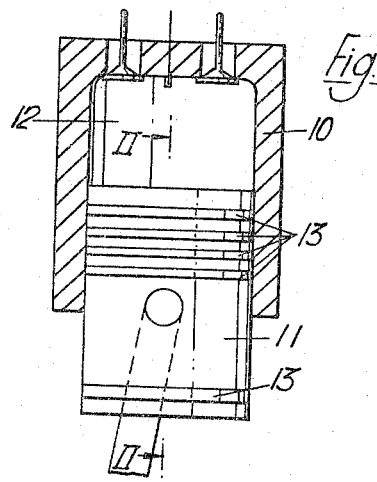
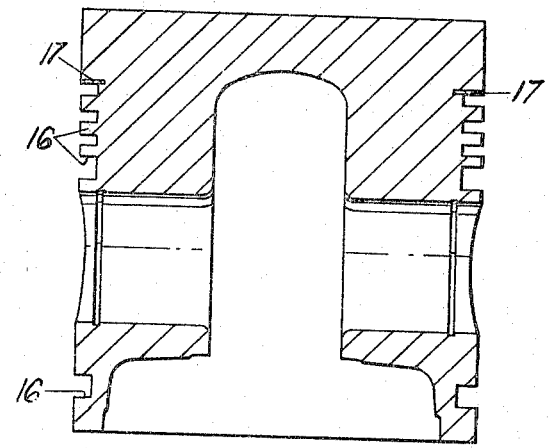
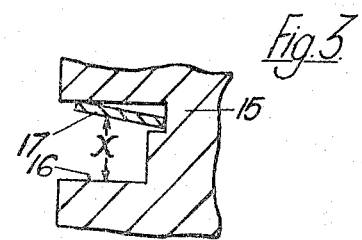
Inventors.
ALEXANDER MAC LEAN PORKESS,
ERIC HUGH KEMP &
JOHN BARRY MATTHEWS
BY Tweedale & Gerhardt
Attorneys.

May 30, 1967  A. M. PORKESS ET AL  3,321,824
PISTONS
Filed Dec. 4, 1964  2 Sheets-Sheet 2
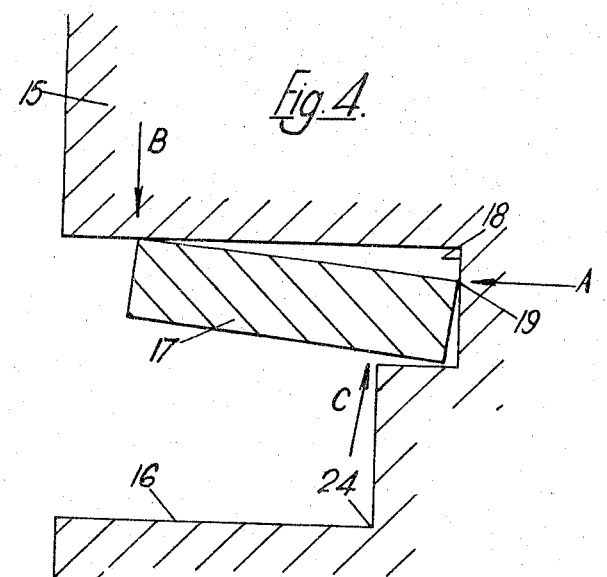
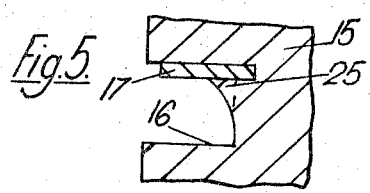
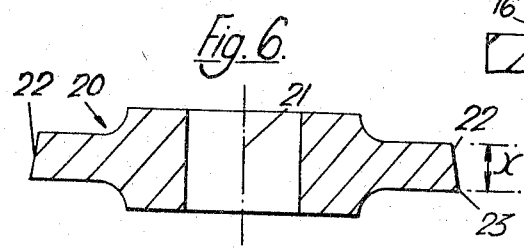
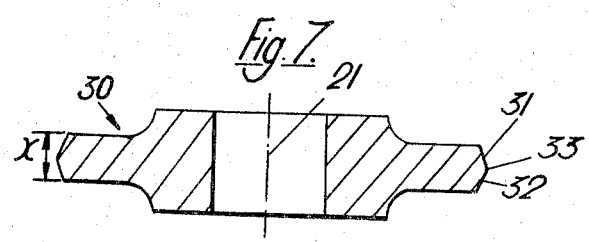
Inventors.
ALEXANDER MAC LEAN PORKESS,
ERIC HUGH KEMP &
JOHN BARRY MATTHEWS
BY
Tweedale & Gerhardt
Attorneys

United States Patent Office 3,321,824
Patented May 30, 1967

3,321,824
PISTONS
Alexander Maclean Porkess, Headingley, Eric Hugh Kemp, Glinton, near Peterborough, and John Barry Matthews, Orton Longueville, England, assignors, by mesne assignments, to Perkins Engines Limited, London, England, a British company
Filed Dec. 4, 1964, Ser. No. 415,993
Claims priority, application Great Britain, Dec. 18, 1963, 49,909/63
7 Claims. (Cl. 29—156.5)

This invention relates to machines such as internal combustion engines including relatively movable piston and cylinder elements forming between them an expansible chamber. More specifically the invention is concerned with pistons and rings for machines of the type aforesaid.

Commonly, such machines consist of a stationary cylinder and a close-fitting piston mounted for reciprocation in said cylinder; such machines may be used as internal combustion engines, pumps, or fluid motors.

It should be understood that the terms "upper" and "lower" used herein and in the claims are intended to refer to a machine of the type aforesaid in which the relative movement between the piston and the cylinder takes place in a vertical direction. Machines of the type aforesaid may however be operated such that the relative movement takes place in a horizontal direction or in a direction inclined to the vertical or horizontal and in such cases the terms "upper" and "lower" should be construed accordingly.

Although the piston is a close sliding fit in the cylinder, there is a working clearance between the surface of the piston and the cylinder wall. Normally this clearance is taken up by means of at least one, and generally a number of, piston rings which are movably located in circumferential recesses or grooves in the piston, each groove having an upper and a lower surface and an inner wall joining the upper and lower surfaces. The rings may be formed of resilient material with a gap in each ring in order that, in operation, the ring springs outwards into engagement with the cylinder wall. The gap permits this outward springing and also allows for circumferential expansion of the ring due to heat generated when the machine is in operation.

However by virtue of the fact that each ring can move to a limited extent both axially and radially in its locating groove, rubbing contact between the ring and the groove leads to wear of both these elements. Where multiple rings are provided the function of the upper ring is to provide a fluid seal. Hence such wear is detrimental to efficient operation of the machine. The ring is a small item and is readily replaceable, but the groove is formed in the piston and hence wear of the groove may involve scrapping of the entire piston.

Wear occurs to a greater degree in the ring nearest to the variable volume chamber and particularly in the upper surface of the associated groove. Shocks from the working fluid are transmitted to this ring first and it is thus subjected to a rapid series of sudden and violent shocks resulting in corresponding sudden and violent axial movement of the ring relative to its groove. The total wear is caused by a combination of effects arising from this axial movement, radial movement of the ring relative to the groove, the thermal expansion and contraction of the piston and ring due to the heat of operation, and the abrasive effects of the working fluid.

Wear of the type described above may occur to a considerable degree in internal combustion engines having pre-combustion chambers. In such engines a jet of high temperature gas issues from the pre-combustion chamber and sets up a very high temperature locally where it impinges on the piston. For various reasons in certain previously proposed engines having pre-combustion chambers, the jet impinges on the piston close to one edge of the top surface of the piston. The wear properties in this region are therefore reduced because of the high local temperatures. Thus the shocks referred to above are particularly violent in an engine of this kind so that wear of the piston ring groove and of the piston ring is a serious problem. Moreover the wear may be accentuated due to the high temperature causing local disruption of the lubricating oil film.

The piston and rings are generally made of light weight alloy materials which are particularly susceptible when heated to wear of the type described above.

It is therefore an object of the present invention to provide a method and means of reducing the wear in piston ring grooves.

It is a further object of the invention to provide a method of securing a wear resistant insert in a piston ring groove.

A further object of the invention is to provide a method of securing such an insert in a piston ring groove so that the abutting surfaces of the insert and ring groove are sealed against gases and foreign particles.

Still another object of the invention is to provide a method of securing an insert in a piston ring groove by deformation of the piston material to clamp the insert in a fixed sealed manner.

A further object is to provide a piston in or for a machine of the type aforesaid, the piston including at least one circumferential groove and a metallic insert clamped in abutment with a surface of the groove according to the method of any of the five immediately preceding paragraphs.

An additional object is to provide a piston in or for a machine of the type aforesaid, the piston including at least one circumferential groove each groove having an upper and a lower surface and an inner wall joining the upper and lower surfaces and a metallic insert clamped in abutment with a surface of the groove by metal deformed from the inner wall.

These and other objects and advantages will be readily apparent from the following description and accompanying claims.

Briefly the invention involves locating a metallic wear resisting insert in a piston ring groove, the groove having an upper and a lower surface and an inner wall including placing the insert in the groove adjacent the upper or lower surface of the groove and deforming the metal of the inner wall of the groove to force the insert into a position in which it abuts against the upper or lower surface of the groove, thereby clamping the insert in said position.

Both the upper and lower surfaces of the groove may be provided with inserts and all the grooves of the piston may be treated in the same way. Alternatively any one or more of the inserts may be omitted and generally it is sufficient to provide a single insert in the upper surface of the upper groove.

Preferably the deformation of the groove wall is effected by means of a roller having at least one rolling face engageable with and inclined with respect to the inner wall of the groove.

Where only one insert is to be located in the groove, the metal of the inner wall may be deformed towards the insert from the end of the inner wall opposite to the surface of the groove against which the insert is to be clamped. Where two inserts are to be simultaneously located in the groove, the roller can have two oppositely inclined rolling surfaces which deform the metal of the inner wall towards both inserts from a point midway between the upper and lower surfaces of the groove.

Preferably also the insert is dished in the form of a conical washer and is deflected from this dished configuration when clamped in place.

Embodiments of the invention will now be described by way of example only, with reference to the accompanying drawings, in which:

FIG. 1 is a diagrammatic elevation, partly in section, of part of an internal combustion engine being a machine of the type aforesaid;

FIG. 2 is an enlarged section through a piston embodying the invention and corresponding to a section on the line II–II of FIG. 1;

FIG. 3 is a further enlarged view of the a detail of FIG. 2 before rolling;

FIG. 4 is an enlarged view of FIG. 3, again before rolling;

FIG. 5 is a view similar to FIG. 3 after rolling and showing both upper and lower inserts in a groove;

FIG. 6 is a sectional elevation of a roller; and

FIG. 7 is a view similar to FIG. 6 of a modified roller.

Referring to the drawings, there is shown in FIG. 1 part of an internal combustion engine including a cylinder 10 and a vertically acting piston 11 slidably located in the cylinder for reciprocable movement, the piston and cylinder forming between them a chamber 12 of variable volume. Four piston rings 13 are located in grooves in the upper portion of the piston and one in the lower portion of the piston.

FIGURE 2 shows a piston 15 removed from its cylinder and without its rings. Five ring-receiving grooves 16 are formed in the piston and a metallic insert 17 is fitted in the upper surface of the upper groove. The piston is of light weight aluminum alloy and the insert is of steel.

FIGS. 3 and 4 show the metallic insert 17 in greater detail. To secure the insert in place in the groove 16, some of the piston metal is removed to form a further groove or recess 18 so that the insert can slide into the position shown in FIG. 3. As shown in greater detail in FIG. 4, the insert is dished in the nature of a conical washer. A circumferential gap, not shown, is provided in the insert similar to that provided in the piston ring, and the insert is sprung apart and inserted in the piston ring groove 16, the inner diameter entering a recess 18 and its upper edge 19 gripping against the inner wall of the groove at A. The insert is then forced upwards and secured in place by deforming the metal of the inner wall of the groove 16 so that it adopts the shape shown in FIG. 5.

Deformation can be effected by means of a roller 20 shown diagrammatically in FIG. 6. The roller may be of carbon steel or other hard wearing material and has a rolling axis 21 and an inclined peripheral surface 22 the height $x$ of which corresponds roughly to the height of the groove 16 less the depth of the insert. The roller is inserted into the groove 16 with the peripheral edge 23 in contact with the lower corner 24 of the groove. The piston 15 is rotated slowly about its vertical axis, as seen in FIGS. 1 to 5, thus causing the roller to rotate about its axis 21. The pressure at the corner 24 forces the metal of the back wall of the groove to flow upwards and outwards into the position shown in FIG. 5 to form a deformed back wall upwardly inclined towards the top insert 17. As the piston rotates the roller effects deformation of the metal completely around the groove.

During deformation, as the metal flows towards the insert, the pressure at C increases and in deflecting the insert out of its dished form, a pressure is exerted between the insert and the upper surface of the groove 16 at B. When the rolling operation is completed the insert is clamped against the upper surface of the groove by the deformed metal of the inner wall and is sealed across pressure zones at B and C. A pressure zone at A assists in preventing deposition of carbon immediately radially inwardly of the insert. The deformed portion 25 of the metal serves to support the insert 17 and forces it firmly against the upper surface of the groove 16.

FIG. 7 shows a modified form of roller 30 for use when it is desired to locate inserts in both the upper and lower groove surfaces simultaneously as shown in FIG. 5. The height $x$ of the peripheral surface corresponds roughly to the height of the groove 16 less the depth of the two inserts 17 and 17′, but the surface in this case consists of two oppositely inclined portions 31 and 32 sloping inwards from a large diameter peripheral edge 33. This roller is used in a manner similar to the FIG. 4 embodiment but metal flow occurs in two directions from the edge 33 to clamp inserts firmly against the upper and lower surfaces of the groove 16.

By virtue of the provision of the metallic insert or inserts, wear of the piston ring grooves is reduced as also is wear of the rings since wear of one part normally tends to lead to wear of the other. The insert, being of more wear-resistant material than the piston is capable of withstanding a lower standard of lubrication. Moreover by clamping the inserts firmly in position by means of the deformation of the metal of the grooves, the formation of crevices between the insert and the groove surfaces is prevented and carbon deposits or fluid cannot become lodged between these surfaces. The pressure zones at A, B, and C assist in keeping carbon and fluid out. The pressure of such carbon or fluid could, if allowed to lodge between the surfaces, force the insert out of position and lead to a number of faults including jamming of the ring in the groove, or wear of the cylinder barrel.

Modifications may be made without departing from the ambit of the invention. For example, though in the embodiment the piston is of aluminum alloy and the insert of steel, any other suitable metals may be used the main requirement being that the insert is of a material having greater resistance to wear than the material of the piston. In a further modification an annular ridge or other protuberance could be provided on the surface of the insert over which the metal is to be deformed, this protuberance serving to hold the insert more firmly in position and prevent radial or axial displacement which would result in ingress of carbon or fluid.

Also deformation may be effected by means other than a roller. For example, it may be effected by a burnishing tool in the form of a bar which, in use, would be disposed more or less radially of the piston as the latter rotated and would deform the metal in a similar manner to the roller described above. In a further modification, deformation may be effected by a pair of semi-circular dies which, in use, would be brought together under pressure and held in position as the piston rotated. Inclined peripheral faces similar to those on the above described roller would be provided on the burnishing tool and the dies.

Other modifications and applications of the invention will be readily apparent to those skilled in the art and are deemed to be within the scope of the invention which is limited only by the following claims.

What is claimed is:

1. A method of locating a metallic, wear-resisting insert in a piston ring groove, the groove having an upper and a lower surface and an inner wall, the method including the steps of placing the insert in the groove adjacent at least one radial surface of the groove, and deforming the metal of the inner wall of the groove by the application of pressure to the inner wall of the groove adjacent the insert to cause metal to flow into contact with the insert, thereby to force the insert into a position in which it abuts against one of the surfaces of the groove, thereby clamping the insert in said position.

2. A method according to claim 1 in which a second insert is simultaneously located and forced against the opposite surface of the groove in a similar manner.

3. A method according to claim 1 in which deformation is effected by means of a roller having a rolling face engageable with and inclined with respect to the inner wall of the groove, said face of the roller being disposed in engagement with the inner wall of the groove and the piston being pressed against the roller and rotated.

4. A method according to claim 1 in which deformation is effected by means of a burnishing tool in the form of a bar having a face engageable with and inclined with respect to the inner wall of the groove, said bar being disposed substantially radially of the piston with said face disposed in engagement with the inner wall of the groove and the piston being rotated while applying pressure to the bar.

5. A method according to claim 1 in which deformation is effected by means of a pair of semi-circular dies each having a face engageable with and inclined with respect to the inner wall of the groove, said faces of the dies being introduced into the groove in contact with the inner wall and the piston being rotated while applying pressure to the dies.

6. A method according to claim 1 including the initial step of enlarging a portion of the groove for insertion of the insert.

7. A method according to claim 1 in which the insert is dished in the form of a conical washer, said deformation being effective to deflect the dished insert out of its dished form.

References Cited

UNITED STATES PATENTS

| | | | |
|---|---|---|---|
| 2,262,074 | 11/1941 | Weltz | 29—156.5 X |
| 2,301,944 | 11/1942 | Giberti. | |
| 2,415,984 | 2/1947 | Ballard | 277—188 |
| 2,550,879 | 5/1951 | Stevens | 92—222 |
| 2,564,025 | 8/1951 | Morton | 277—188 |
| 2,630,358 | 3/1953 | Stevens | 277—188 |
| 2,815,255 | 12/1957 | Phillips et al. | 29—156.5 X |
| 3,075,817 | 1/1963 | Mayes | 29—156.5 X |

FOREIGN PATENTS

| | | |
|---|---|---|
| 401,085 | 11/1933 | Great Britain. |
| 413,050 | 7/1934 | Great Britain. |

JOHN F. CAMPBELL, *Primary Examiner.*

MARTIN P. SCHWARDRON, *Examiner.*

P. M. COHEN, G. BAUM, *Assistant Examiners.*